(12) United States Patent
Gilson et al.

(10) Patent No.: US 7,548,641 B2
(45) Date of Patent: Jun. 16, 2009

(54) SYSTEM AND METHOD FOR EMBEDDING CHECK DATA IN A CHECK IMAGE

(75) Inventors: Jonathan C. Gilson, Roswell, GA (US); Christopher S. Weber, Arlington, TX (US)

(73) Assignee: VECTORsgi, Inc., Addison, TX (US)

( * ) Notice: Subject to any disclaimer, the term of this patent is extended or adjusted under 35 U.S.C. 154(b) by 830 days.

(21) Appl. No.: 11/115,015

(22) Filed: Apr. 25, 2005

(65) Prior Publication Data

US 2006/0182331 A1 Aug. 17, 2006

Related U.S. Application Data

(63) Continuation-in-part of application No. 11/060,655, filed on Feb. 17, 2005, now Pat. No. 7,447,347.

(51) Int. Cl.
*G06K 9/00* (2006.01)

(52) U.S. Cl. .................................. 382/137; 382/306

(58) Field of Classification Search ................ 382/137, 382/139, 140, 305–306, 318, 320
See application file for complete search history.

(56) References Cited

U.S. PATENT DOCUMENTS

| | | | |
|---|---|---|---|
| 4,797,938 A | | 1/1989 | Will |
| 4,888,812 A | * | 12/1989 | Dinan et al. ................ 382/140 |
| 5,265,007 A | | 11/1993 | Barnhard, Jr. et al. |
| 5,583,759 A | | 12/1996 | Geer |
| 5,631,984 A | | 5/1997 | Graf et al. |
| 5,687,250 A | | 11/1997 | Curley et al. |
| 5,717,868 A | | 2/1998 | James |
| 5,910,988 A | | 6/1999 | Ballard |
| 5,917,965 A | * | 6/1999 | Cahill et al. ................ 382/305 |
| 5,930,778 A | | 7/1999 | Geer |
| 6,032,137 A | | 2/2000 | Ballard |
| 6,181,837 B1 | | 1/2001 | Cahill et al. |
| 6,243,504 B1 | | 6/2001 | Kruppa |
| 6,574,377 B1 | | 6/2003 | Cahill et al. |
| 6,591,009 B1 | | 7/2003 | Usami et al. |
| 6,654,487 B1 | | 11/2003 | Downs, Jr. |
| 6,782,144 B2 | | 8/2004 | Bellavita et al. |
| 6,807,285 B1 | | 10/2004 | Iwamura |
| 6,816,608 B2 | | 11/2004 | Cato |
| 2001/0022849 A1 | | 9/2001 | Simonoff |

(Continued)

OTHER PUBLICATIONS

"Specifications for Electronic Exchange of Check and Image Data," Financial Services Draft Standard for Trial Use, DSTU X9.37-2003, Accredited Standards Committee X9, Inc., Jan. 21, 2003, 162 pages.
TIFF™, Revision 6.0, Adobe Developers Association, Jun. 3, 1992, pp. 1-121.

(Continued)

*Primary Examiner*—Andrew W Johns
(74) *Attorney, Agent, or Firm*—Fish & Richardson P.C.

(57) ABSTRACT

An image capture system for retaining check processing data comprises a camera operable to generate an electronic check image of a physical check, with the electronic check image operable to generate an image replacement document. The system includes a scanner operable to process the check image to generate check processing data and one or more processors operable to embed at least a portion of the check processing data in the electronic check image. The embedded check processing data is typically operable to be subsequently identified.

31 Claims, 4 Drawing Sheets

U.S. PATENT DOCUMENTS

| | | |
|---|---|---|
| 2003/0156733 A1 | 8/2003 | Zeller et al. |
| 2003/0161523 A1 | 8/2003 | Moon et al. |
| 2004/0131224 A1 | 7/2004 | Tanaka |
| 2004/0263911 A1 | 12/2004 | Rodriguez et al. |
| 2005/0071283 A1* | 3/2005 | Randle et al. ............... 705/75 |
| 2005/0213805 A1* | 9/2005 | Blake et al. ............... 382/137 |
| 2005/0281448 A1* | 12/2005 | Lugg ............... 382/139 |

OTHER PUBLICATIONS

International Search Report and Written Opinion of the International Searching Authority issued in counterpart International Application No. PCT/US2006/004869; Jul. 24, 2006; 12 pages.

Notification Concerning Transmittal of International Preliminary Report on Patentability and International Preliminary Report on Patentability under Chapter 1 issued on Aug. 30, 2007 in International Application No. PCT/US2006/004869; 8 pages.

* cited by examiner

SYSTEM AND METHOD FOR EMBEDDING CHECK DATA IN A CHECK IMAGE

RELATED APPLICATION

This application is a continuation-in-part of and claims priority from U.S. application Ser. No. 11/060,655, filed Feb. 17, 2005 now U.S. Pat. No. 7,447,347, the disclosure of which is incorporated by reference herein.

TECHNICAL FIELD

This invention relates to check processing and, more specifically, to a system and method for embedding check data in a check image.

BACKGROUND

Currently, the bank of first deposit receives a physical check from the point-of-sale (or point-of purchase), with the physical check including a Magnetic Ink Character Recognition (MICR) code. The bank processes these checks using any suitable technique and communicates the physical check to the recipient (or payor) bank for storage or forwarding to the appropriate account holder. For example, the checks are typically sorted according to payor bank, bundled together, and physically shipped to the receiving bank. This physical handling of checks and other commercial paper transactions requires large amounts of labor, costs, and storage space and is subject to various threats. But the Check Clearing for the 21st Century Act, commonly referred to as "Check 21," provides a framework for recipient banks to accept electronic images of checks from other banks, thereby reducing costs and physical threats and increasing efficiency. Each electronic image may then be printed to generate an image replacement document, which is the legal equivalent of a physical check.

SUMMARY

This disclosure provides system and method for embedding check data in a check image. In certain embodiments, for example, an image capture system for embedding check data in the check image comprises a camera operable to generate an electronic check image of a physical check, with the electronic check image operable to generate an image replacement document. The image capture system further comprises a scanner operable to identify MICR code data from the physical check and one or more processors. The one or more processors are operable to embed the identified MICR code data in the electronic check image, with the embedded MICR code data in the original format. The one or more processors may also embed truncated MICR code data in the electronic check image, with the truncated MICR code data comprising a portion of the identified MICR code data.

In other alternative or complimentary embodiments, software for retaining check processing data operable to generate an electronic check image of a physical check, with the electronic check image operable to generate an image replacement document. The software is further operable to process the check image to generate check processing data and embed at least a portion of the check processing data in the electronic check image. The embedded check processing data is normally operable to be subsequently identified. The software may be further operable to compress the check processing data prior to embedding in the electronic check image.

The details of one or more embodiments of the invention are set forth in the accompanying drawings and the description below. One or more embodiments of the invention may include several important technical advantages. Generally, the disclosed structures and techniques may help a bank or other financial institution avoid delays of ground and air transportation, lessen the chance of checks being lost, and reduce or eliminate backlogs created by paper checks that cannot be physically transported due to weather or unforeseen events. Further, the disclosure may also allow additional revenue in financial areas including correspondent bank processing, lockbox processing, corporate image deposits, and a variety of branch-based applications. For example, the financial institution may inspect a received electronic check image and determine the one or more institutions that processed the image prior to itself. In another example, the described embodiments may allow the financial institution to inspect and verify the various Image Quality Analysis (IQA) tests performed by such prior institutions. Moreover, the embedding of this check processing data might allow the processing institution to provide verification to other financial institutions or governmental entities. Of course, various embodiments of the invention may have none, some or all of these advantages. Other features, objects, and advantages of the invention will be apparent from the description and drawings, as well as from the claims.

DETAILED DESCRIPTION

Figure 1:
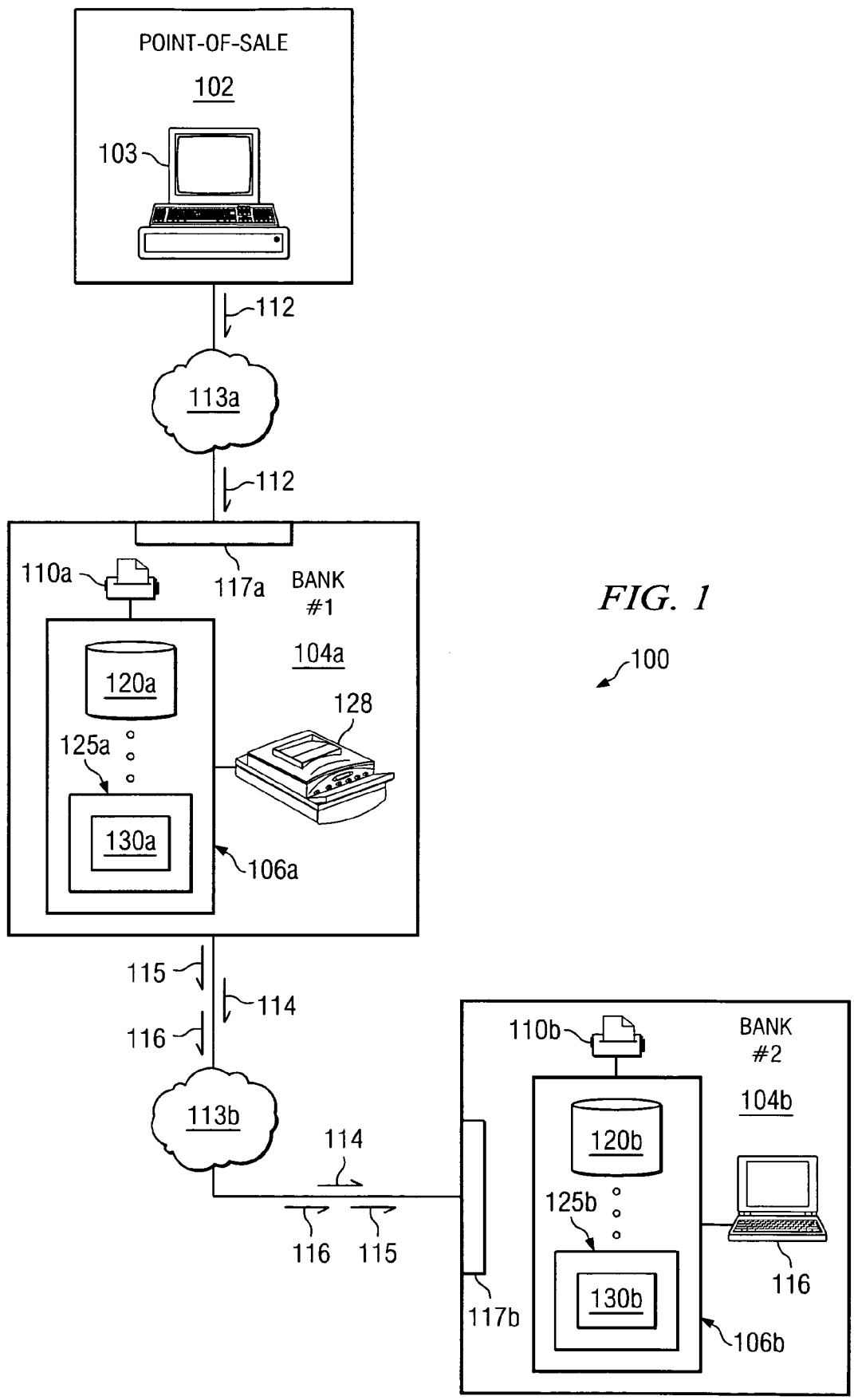
FIG. 1 illustrates a system for retaining MICR code format in accordance with one embodiment of the present disclosure.

FIG. 1 illustrates a system 100 for communicating and processing electronic check images 114 including the originally formatted Magnetic Ink Character Recognition (MICR) code or MICR data 115 in accordance with one embodiment of the present disclosure. In other alternative or complimentary embodiments, system 100 may store, retain, or otherwise embed information, associated with check processing, in electronic check images 114. Such processing information may include, for example, Image Quality Analysis (IQA) data, addendum records, identifiers for associating debits and credits, and others. Moreover, system 100 may store certain records from an X9.37 file (for example) that are associated with the particular check into the respective image 114. These records may include Record Description, File Header Record, Cash Letter Header Record, Bundle Header Record, Check Detail Record, Check Detail Addendum A Record, Check Detail Addendum B Record, Check Detail Addendum C Record, Return Record, Return Addendum A Record, Return Addendum B Record, Return Addendum C Record, Return Addendum D Record, Image View Analysis Record, Bundle Control Record, Cash Letter Control Record, File Control Record, and many others. It will be understood that embedding the check processing data generally encompasses at least storing such data or a suitable representative or derivative thereof into the image file for subsequent storage, processing, or communication.

Generally, system 100 includes at least a portion of any financial or banking system operable to process commercial paper transactions (such as checking), generate at least one electronic check image 114 associated with an image replacement document (IRD) for at least a particular one of the transactions, and identify or capture, process, communicate, and/or archive the MICR code 115 in its original format, as well as other check processing data, in the check image. For example, system 100 may receive a physical check at a receiving entity 102, capture an electronic image 114 and MICR data 115 (often termed a MICR code or a MICR line) from the check at a first financial institution 104, and embed the captured MICR data 115 in the original format, as well as a truncated format. The embedded MICR code may then be archived in a repository or archive 220 (as in FIG. 2) for subsequent viewing and processing in its original format. In certain embodiments, the embedded MICR code (in its original format) may be communicated to a second financial institution 104.

It will be understood that each check's MICR data 115 may be in any appropriate format including E13-B, CMC-7, output from Optical Character Recognition (OCR), as well as others (including other standards, versions, formats, or ink types). MICR data 115 typically includes a plurality of fields including routing/transit field, account field, serial field, and others. For example, MICR data 115 may include an auxiliary on-us field, a routing/transit number, an on-us field, a check number, and an amount field. The auxiliary on-us field is typically a check number used for commercial or corporate checks. The routing/transit number typically indicates i) the Federal Reserve District from which the transaction should be cleared; ii) the Federal Reserve Bank or Branch serving the area where the recipient financial institution 104 is located; and iii) identifies the number assigned to the recipient financial institution 104 by the American Bankers Association. The on-us field (or account number and serial number fields) includes the check writer's account number at the payee financial institution 104 and, in the case of personal checks, may include the check number. The amount field includes the MICR version of the transaction amount and is normally encoded by the financial institution 104 of first deposit. It will be understood that the described fields are for example purposes only and one or more these fields may not be captured without departing from the scope of this disclosure. Typically, the MICR data 115 on each physical check is formatted according to one of a plurality of conventional or propriety standards that include, for example, dashes and spaces between some or all of the fields. In certain embodiments, the original and embedded MICR data 115 may differ slightly. For example, the identified MICR code 115 may comprise a plurality of fields with at least two of the fields separated by a dash and two of the fields (even one of the two dashed fields) separated by spaces, while the embedded MICR code data includes the plurality of fields and the dash without the spaces.

Returning to the illustrated embodiment, system 100 is typically (but not necessarily) distributed into at least one receiving entity (or point-of-sale) 102 and two or more financial institutions 104, illustrated as first and second financial institutions 104a and 106b. Often, system 100 is electronically inter-coupled, thereby allowing efficient communications among the various components. But system 100 may be a standalone processing environment, such as system 100 consisting of one financial institution 104 with a plurality of offices interconnected via an intranet, or any other suitable banking environment operable to dynamically retain MICR data 115 in its original format without departing from the scope of this disclosure. The term "dynamically," as used herein, generally means that certain processing is determined, at least in part, at run-time based on one or more variables. The term "automatically," as used herein, generally means that the appropriate processing is substantially performed by at least part of system 100. It should be understood that "automatically" further contemplates any suitable user or manager interaction with system 100 without departing from the scope of this disclosure.

Receiving entity 102 is any recipient or payee of the checking or other commercial paper transaction. Receiving entity 102 may be a store, an online vendor, a telephony system, or others. Receiving entity 102 may also represent a teller at one of the financial institutions 104 without departing from the scope of the disclosure. In the illustrated embodiment, receiving entity 102 includes a cash register 103 for receiving and storing physical checks 112. Of course, receiving entity 102 may include other additional or alternative components for processing transactions. For example, receiving entity 102 may include a scanner and/or a computer for processing an example check or electronic payment. While not illustrated, the point-of-sale computer may also include or execute a portion or a copy of check processing engine 130 (illustrated in servers 106a and 106b) for performing or implementing MICR capture or other check processing without departing from the scope of the disclosure. Receiving entity 102 may also be operable to generate an Automated Clearing House (ACH) transaction based on the checking transaction for quickly processing the transaction with financial institutions 104. Regardless, at any appropriate time and using any suitable automatic or manual technique, receiving entity 102 communicates the checks to a first financial institution 104 for subsequent processing.

Figure 2:
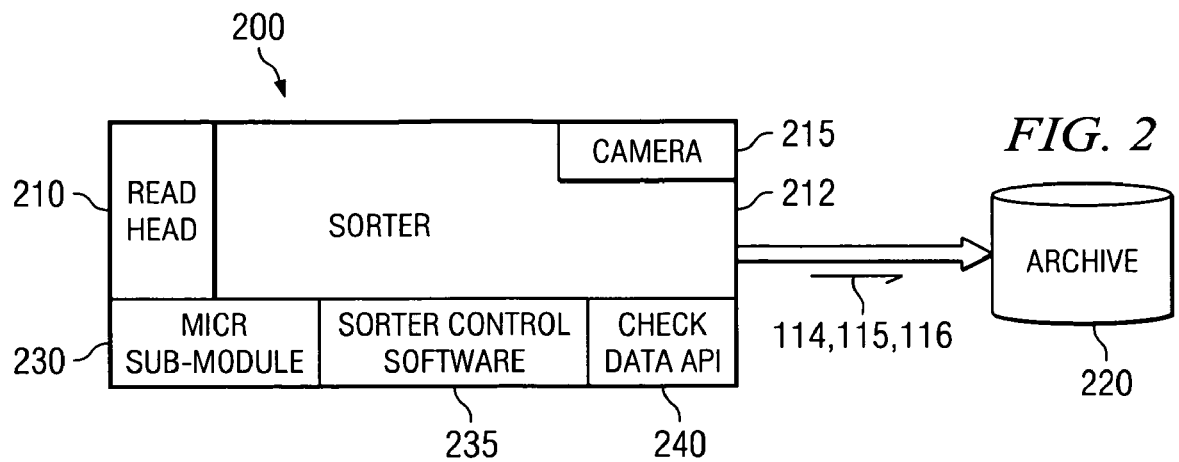
FIG. 2 illustrates an example image capture system for use by one of the entities in FIG. 1 to generate the electronic check image with embedded MICR data.

Financial institution 104 is any agent, third-party resource, clearing house, branch, processing center, or central office of a financial institution. Indeed, while illustrated as two banks, first financial institution 104a and second financial institution 104b respectively, any number of banks and/or other institutions may be included in system 100 without departing from the scope of this disclosure. Moreover, two or more financial institutions 104 may represent two or more routing/transit numbers associated with one institution. In other words, each financial institution 104 may have the same, similar, or distinct components from illustrated financial institutions 104. Returning to the illustrated embodiment, each financial institution 104 includes server 106, printer 110, and scanner 128. Printer 110 is any device operable to generate a hard copy from an electronic image. For example, financial institution 104 may include a plurality of checks or other commercial paper transactions in electronic form, which may then printed as image replacement documents (IRDs) using printer 110. These IRDs may then be considered a legal copy of the associated check. Scanner 128 is any suitable device operable to capture or otherwise obtain information from the received physical transactions, such as the checks from receiving entity 102. For example, scanner 128 may be a scanner, a sorter, an image capture system 200 (as illustrated in FIG. 2) or any other similar device (or combination thereof) including a digital camera for recording or generating electronic images 114 of the checks and a MICR reader for capturing MICR data 115 from the checks. The example digital camera may record an electronic check image 114 of the front and back of each check in black and white, grayscale, and/or color. As used herein, electronic check image 114 may be a digital image or file of the check including the front, the back, both, or any suitable portion thereof. This check image 114 may be in any suitable format including Moving Picture Experts Group (MPEG), Joint Photographic Experts Group (JPEG), Tag Image File Format (TIFF), including any suitable version thereof (such as TIFF 6.0), CIM, and others. For example, the TIFF file may include one or more tagged fields that may be customized or used for MICR data 115. In certain embodiments, electronic check image 114 may be stored in a file that includes a data or image header, a front image in black/white, a front image in grayscale, a back image in black/white, and a back image in grayscale. The MICR reader may capture or generate MICR data 115 in its original format, which is a plurality of fields including routing/transit field, account field, serial field, and others separated by spaces and/or dashes.

Banking server 106 includes memory 120 and processor 125 and comprises an electronic computing device operable to receive, transmit, process, and store data associated with system 100 and, more specifically, associated financial institution 104. For example, server 106 may be any computer or processing device such as, for example, a blade server, general-purpose personal computer (PC), Macintosh, workstation, a mainframe, or any other suitable device. Generally, FIG. 1 provides merely one example of computers that may be used with the disclosure. For example, although FIG. 1 illustrates one server 106 that may be used with the disclosure, system 100 can be implemented using computers other than servers, as well as a server pool. In other words, the present disclosure contemplates computers other than general purpose computers as well as computers without conventional operating systems. As used in this document, the term "computer" is intended to encompass a personal computer, workstation, network computer, or any other suitable processing device. Server 106 may be adapted to execute any operating system including Linux, UNIX, Windows Server, or any other suitable operating system. According to one embodiment, server 106 may also include or be communicably coupled with a web server and/or a secure financial server.

Memory 120 may include any memory or database module and may take the form of volatile or non-volatile memory including, without limitation, magnetic media, optical media, random access memory (RAM), read-only memory (ROM), removable media, or any other suitable local or remote memory component. In the illustrated embodiment, memory 120 includes electronic check images 114, but memory 120 may include any appropriate data such as an audit log, account information, administration profiling, MICR data 115, one or more hash values, and others. For example, memory 120 may store electronic check images 114 in an object-oriented or a relational database, typically including tables defined using SQL statements and interrelated using schemas. In this example, one table may store electronic check images 114 and another table may store associated MICR data 115 in its original format and, when appropriate, the truncated format. In another example, memory 120 may store electronic check images 114 (with embedded MICR data 115 and/or other check processing data) in text files, extensible Markup Language (XML) documents, Virtual Storage Access Method (VSAM) files, TIFF files, CIM files, flat files, Btrieve files, comma-separated-value (CSV) files, internal variables, one or more libraries, encrypted files, and others.

Server 106 also includes processor 125. Processor 125 executes instructions and manipulates data to perform the operations of server 106 such as, for example, a central processing unit (CPU), a blade, an application specific integrated circuit (ASIC), or a field-programmable gate array (FPGA). Although FIG. 1 illustrates a single processor 125 in server 106, multiple processors 125 may be used according to particular needs and reference to processor 125 is meant to include multiple processors 125 where applicable. In the illustrated embodiment, processor 125 executes check processing engine 130, which captures MICR data 115 for its original format for electronic check images 114 and subsequent processing.

Check processing engine 130 is typically software and may be written or described in any appropriate computer language including, for example, C, C++, Java, J#, Visual Basic, assembler, Perl, any suitable version of 4GL, or any combination thereof. As used herein, software generally includes any appropriate combination of software, firmware, hardware, and/or other logic. In certain embodiments, check processing engine 130 is any module, sub-module, subroutine, or process operable to, among other things, automatically capture and store MICR data 115 in its original format. Check processing engine 130 may be further (or alternatively) operable to identify or generate check processing data or associated information and to embed, store, or otherwise retain such data or information in the associated electronic check image 114. It will be understood that while check processing engine 130 is illustrated in FIG. 1 as a single multi-tasked module, the features and functionality performed by this engine may be performed by multiple modules such as in FIG. 2, for example, or an image generation module, a check processing module, and an administration module. Further, while illustrated as internal to server 106, one or more processes associated with check processing engine 130 may be stored, referenced, accessed, or executed remotely (such through receiving entity 102). For example, such distributed modules may be in communication with one another through XML transactions using Simple Object Access Protocol (SOAP) over HTTP. Moreover, check processing engine 130 may be a child or sub-module of another software module (not illustrated) without departing from the scope of this disclosure.

In one embodiment, check processing engine 130 may include or be communicably coupled with an administrative workstation or graphical user interface (GUI) 116. For example, the workstation may comprise a computer that includes an input device, such as a keypad, touch screen, mouse, or other device that can accept information, and an output device that conveys information associated with the operation of server 106 or receiving entity 102, including digital data, visual information, or GUI 116. Both the input device and output device may include fixed or removable storage media such as a magnetic computer disk, CD-ROM, or other suitable media to both receive input from and provide output to users through the display, namely GUI 116.

GUI 116 comprises a graphical user interface operable to allow the user of the workstation to interface with at least a portion of system 100 for any suitable purpose. Generally, GUI 116 provides the user of the workstation with an efficient and user-friendly presentation of data provided by or communicated within system 100. GUI 116 may comprise a plurality of customizable frames or views having interactive fields, pull-down lists, and buttons operated by the user. In one embodiment, GUI 116 presents reports that includes the various processed check information and associated buttons and receives commands from the user via one of the input devices. In an alternative embodiment, GUI 116 may be hidden or not implemented. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information in system 100 and efficiently presents the results to the user. Server 106 can accept data from the workstation via the web browser (e.g., Microsoft Internet Explorer or Netscape Navigator) and return the appropriate HTML or XML responses using network 113.

Server 106 may also include interface 117 for communicating with other computer systems or components, such as other server 106 or receiving entity 102, over network 113 in a client-server or other distributed environment. In certain embodiments, server 106 receives electronic images 114 of checks from internal or external senders through interface 117 for storage in memory 120 and/or processing by processor 125. Generally, interface 117 comprises logic encoded in software and/or hardware in a suitable combination and operable to communicate with network 113. More specifically, interface 117 may comprise software supporting one or more communications protocols associated with communications network 113 or hardware operable to communicate physical signals.

Network 113 facilitates wireless or wireline communication between computer servers 106 and any other local or remote computer or component, such as all or a portion of a bank posting system or other intermediate systems. Indeed, while illustrated as two networks, 113a and 113b respectively, network 113 may be a continuous network without departing from the scope of this disclosure, so long as at least portion of network 113 may facilitate communications between the requisite parties or components. In other words, network 113 encompasses any internal or external network, networks, sub-network, or combination thereof operable to facilitate communications between various computing components in system 100. Network 113 may communicate, for example, Internet Protocol (IP) packets, Frame Relay frames, Asynchronous Transfer Mode (ATM) cells, voice, video, data, and other suitable information between network addresses. Network 113 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect of operation receiving entity 102 receives a physical check 112 from a buyer or other payer. After any suitable processing, receiving entity 102 communicates at least this check to first financial institution 104a. For example, receiving entity 102 may collect checks throughout a day or week and communicate these gathered checks to first financial institution 104a in a bundle. Once first financial institution 104a receives some or all of the physical checks, it generates an electronic check image 114 for each check using, for example, scanner 128. Often concurrently, first financial institution 104a also captures MICR data 115 from each check. At any suitable time, first financial institution 104a may perform IQA on the electronic check image 114. The particular tests run and the respective results may then be embedded in the check image 114 or stored in temporary storage (such as a register or software variable) for subsequent storage in image 114. First financial institution 104a may also sort the electronic images 114 and MICR data 115 according to recipient bank (illustrated as second financial institution 104b). In this way, first financial institution 104a may parse out or otherwise collect the electronic data for communication to the appropriate recipient financial institution 104b. First financial institution 104a, typically using check processing engine 130, then embeds the MICR data 115 in the electronic check image 114 using any suitable technique. For example, check processing engine 130 may add the original MICR data in its original format into the DocumentName field in a TIFF file or insert the data into another field and tag it appropriately. Continuing this example, check processing engine 130 may also insert the truncated version of the MICR data 115 (without the formatting or as a hash value) into a similar field. If the IQA tests were performed and the associated information put into temporary storage, the check processing engine may embed such information at this point. First financial institution 104a then generates an addendum record and embeds or appends the record to the electronic check image 114. In certain embodiments, check processing engine 130 may merge the various check processing information into one data structure. This information may then be embedded in one tag or other data structure in check image 114. Moreover, check processing engine 130 may compress (with a standard or proprietary technique) or otherwise encode the data prior to embedding the data in check image 114.

First financial institution 104a then sends the appropriate electronic check images 114 to recipient financial institution 104b for processing. As described above, these electronic check images 114 are each operable generate an IRD, thereby reducing or eliminating the need for shipping the physical checks. First financial institution 104a may create Electronic Check Presentment (ECP) data files, ECP Image Files (ECPi), Image Cash Letters (non-ECP), IRD Cash Letters, and others as appropriate. These data files are typically formatted in compliance with exchange network specifications, populated with image and IQA records (if desired or suitable), and routed to the appropriate exchange network as specified in the profile. For example, first financial institution 104a may communicate electronic check images 114 to an office local to recipient financial institution 104b. The local office may print a plurality of IRDs from the received electronic images 114 and provide the IRDs to the recipient financial institution 104b. Continuing the example, the local office then forwards the electronic check images 114 to the recipient financial institution 104b at any later time. In another example, server 106a may communicate electronic check images 114 to recipient financial institution 104b via network 113. In this example, the bundled check images 114 may conform to the X9.37 standard, which typically allows up to ninety-nine addendum records. However obtained, recipient financial institution 104b is then operable to generate the IRD with the MICR code 115 in the original format, including spaces, dashes, and such. Recipient financial institution 104b may also pull, extract, parse, or otherwise view and process the embedded check processing data using, for example, check processing engine 130b. For example, financial institution 104b may identify certain debits to be associated with a credit, performs its own IQA test and embed such data into check image 114, generate and embed a second addendum record, or perform any other suitable processing.

FIG. 2 illustrates an example image capture system 200 for retaining MICR code format in accordance with one embodiment of the present disclosure. For example, image capture system 200 may be a large check sorter at a financial institution 104. Illustrated image capture system 200 includes a read head 210 or scanner, a sorter 212, and a camera 215. System 200 may include a processor for each of these components, a processor from all of these components, or any combination thereof, so long as system 200 is operable to execute software, firmware, and/or other local or remote logic. These components are typically managed or are communicably coupled with one or all of MICR subroutine 230, sort control software 235, and check data Application Programming Interface (API) 240.

Check data API 240 may be a DLL, an object, a macro, or other process operable to automatically or dynamically identify, embed, and/or retrieve the information into electronic check image 114. For example, check data API 240 may include, reference, or otherwise implement some of the following example functionality, methods, or functions:

```
/*   Return code   */
#define VTMGR_OK                0
#define VTMGR_FAILURE          -1    //store size too small
#define VTMGR_INVALID_TIFF     -2
#define VTMGR_MALLOC_FAILED    -3
/*   Function Protypes   */
/*   store data in tiffimage   */
     int  StoreDataInTiff  (char  *  tiffimage,  long  *
tiffimagelength, short ID, char * data, long datalength)
/*     Input parameters:
     tiffimage is a pointer to the start of the TIFF image
     tiffimagelength is the length of the image buffer that
contains the tiffimage - not the actual length of the TIFF
image
     ID is a user specified ID in the range 1 through 32767
that identifies this data
     data is a pointer to the start of the data to be store
in the TIFF
     datalength is the length of the data to be stored in
the TIFF
     Output:
     tiffimage updated with stored data
     tiffimagelength updated to reflect new actual length
of TIFF image
     if VTMGR_FAILURE is returned, tiffimagelength will be
updated to reflect the required length
*/
/*   extract data from tiffimage   */
     int  ExtractDataFromTiff  (char  *  tiffimage,  long
tiffimagelength, short ID, char * data, long * datalength)
/*    Input parameters:
     tiffimage is a pointer to the start of the TIFF image
     tiffimagelength is the length of the image buffer that
contains the tiffimage - not the actual length of the TIFF
image
     ID is a user specified ID in the range 1 through 32767
that identifies this data
     data is a pointer to the start of the buffer in which
to store the extracted data
     datalength is the length of the buffer
     Output:
     data updated with extracted data
     datalength updated to reflect length of extracted data
- if VTMGR_FAILURE is returned, datalength will be updated
to reflect the required length
*/
/*   remove data from tiffimage   */
     int  RemoveDataFromTiff  (char  *  tiffimage,  long  *
tiffimagelength, short ID)
/*    Input parameters:
     tiffimage is a pointer to the start of the TIFF image
     tiffimagelength is the length of the image buffer that
contains the tiffimage - not the actual length of the TIFF
image
     ID is a user specified ID in the range 1 through 32767
that identifies this data
     Output:
     tiffimage updated with specified data removed
     tiffimagelength updated to reflect new actual length
of TIFF image
*/
```

The foregoing example is for illustration purposes and may not represent check data API 240 as implemented. Indeed, check data API 240 may be operable to embed or extract data from a file in TIFF or any other format. Moreover, check data API 240 may be separated into two modules for embedding or extracting, respectively. It will be understood that reference to check processing engine 130 may include MICR subroutine 230, sort control software 235, or check data API 240, whether alone or in combination. Once image capture system 200 scans check 112 and generates electronic check image 114 with embedded MICR data 115 or the check processing data, it archives the data in archive 220.

Archive 220 is any intra-bank, inter-bank, regional, or nationwide or substantially national electronic storage facility, data processing center, or archive that allows for one or a plurality of financial institutions 104 (as well as receiving entities 102) to store MICR data 115 in its original format or other check processing data for subsequent access or processing. For example, archive 220 may be a central database communicably coupled with points-of-sale 102 and financial institutions 104. In another example, archive 220 may be a tape backup of captured MICR codes 115 or check data. Regardless, archive 220 may include, store all or part of, or otherwise reference archived MICR data 115 and/or check processing data in any appropriate storage format. For example, archive 220 may store MICR data 115 as one or more tables stored in a relational database described in terms of SQL statements or scripts. In this example embodiment, each record may be associated with a particular truncated or hashed MICR code or line as the primary key, with the MICR code in its original format as a related field. The primary key allows for quick access and location. In another embodiment, the one or more MICR codes may be stored or defined in various data structures as text files, XML documents, VSAM files, TIFF files, CIM files, flat files, Btrieve files, CSV files, internal variables, or one or more libraries. In short, archive 220 may comprise one table or file or a plurality of tables or files stored on one computer or across a plurality of computers in any appropriate format. Moreover, archive 220 may be physically or logically located at any appropriate location including in one of the financial institutions 104 or off-shore, so long as it remains operable to store archived images 114 and/or MICR data 115 associated with a plurality of transactions. In certain embodiments, archive 220 may be generic or standard repository. In these cases, images 114 (including the embedded data) may be stored in such an archive 220 without necessitating a reconfiguration of the repository to accommodate the embedded data.

Figures 3A, 3B:
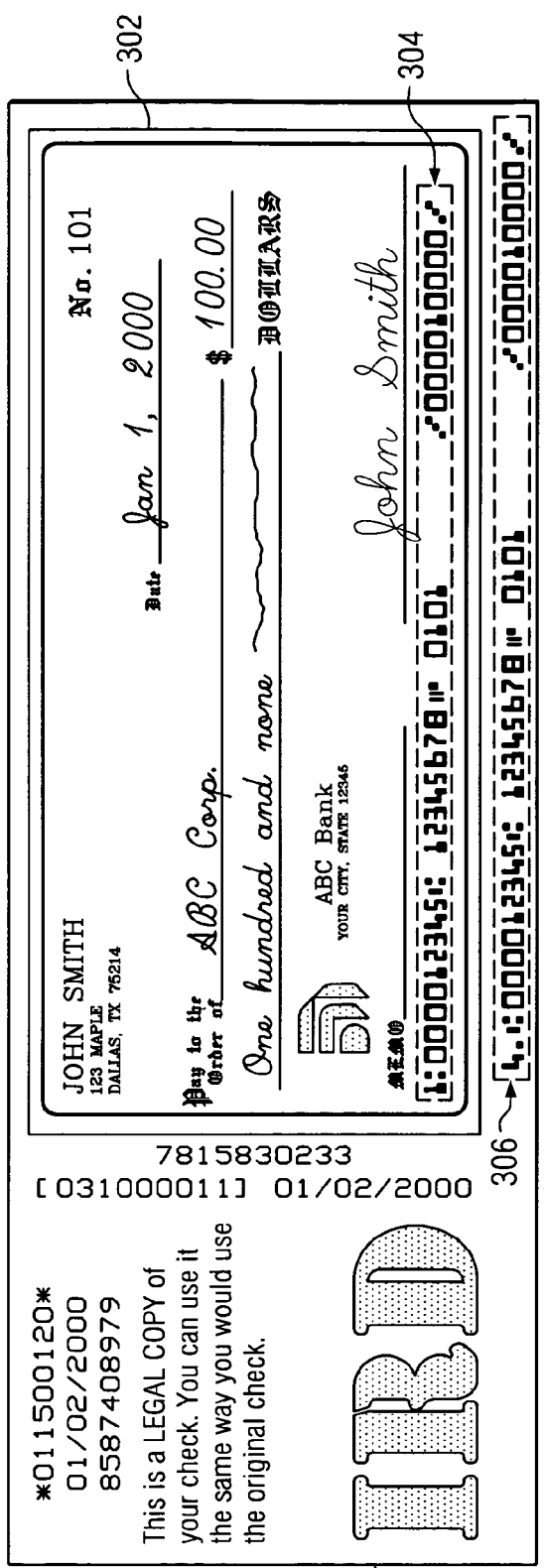
FIGS. 3A-B illustrate one embodiment of an electronic check image in the form of an image replacement document.

FIGS. 3A-B illustrate one embodiment of an image replacement document 300 from an example electronic check image 114. At a high level, FIG. 3A illustrates the front image 300a of a check 302, while FIG. 3B illustrates the back image 300b of check 302 used by the system of FIG. 1. In this embodiment, check 302 is illustrated as a portion of an IRD 300, which may be considered a legal representation of transaction 302. Transaction 302 is associated with two MICR codes 304 and 306, each generated or captured at different points during transaction processing. For example, MICR code 304 may be preprinted on the check prior to the actual transaction. In this example, MICR code 304 includes an item type indicator of "1," a routing number or field 5 of "12345," an account number of "12345678," and a check number of "101." In this example, MICR code 304 has been supplemented with the captured amount, "100.00," perhaps at the receiving entity 102 or the financial institution 104 of first deposit. MICR code 306 is substantially similar to MICR code 304, with the difference involving the item type indicator. In MICR code 304, the item type indicator is "1", while MICR code 306 includes an item type indicator of "4." FIG. 3B illustrates a back portion of IRD 300. This portion of IRD 300 includes various processing, authorization, and deposit data. For example, the back of the check includes the financial institution 104 of first deposit, namely "First National Bank." The back of the check further describes the date of first deposit, item sequence number, and any endorsement, in this case a stamp of "For Deposit Only."

Figure 4:
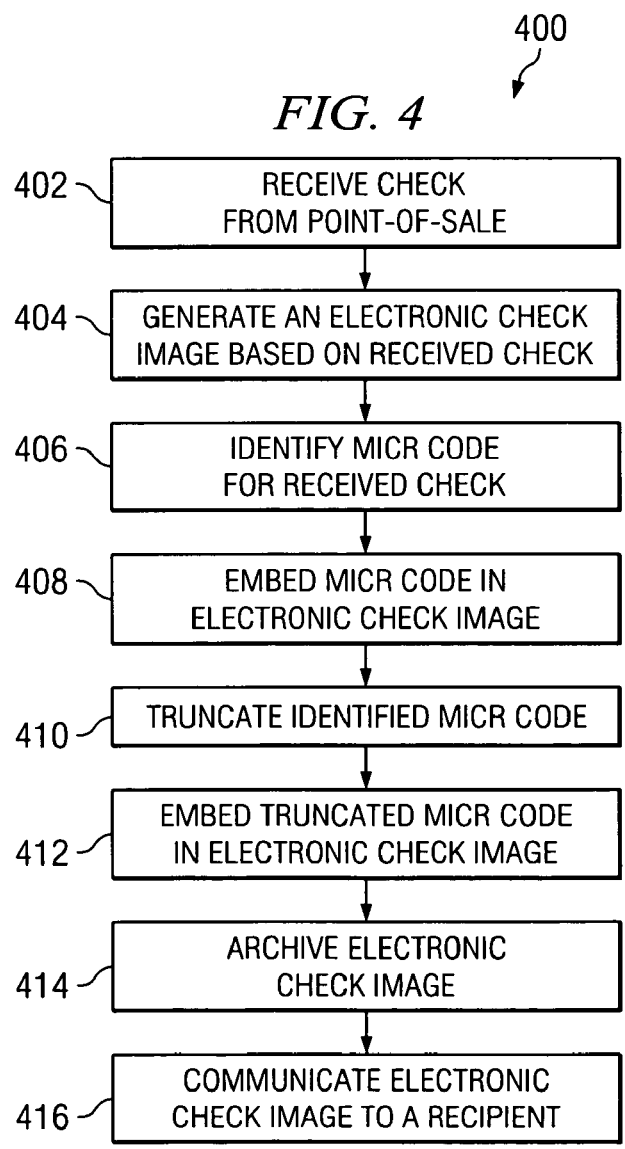
FIG. 4 is a flowchart illustrating an example method for retaining MICR code format in accordance with one embodiment of the present disclosure.

FIG. 4 is a flowchart illustrating an example method 400 for retaining original MICR formatting in accordance with one embodiment of the present disclosure. At a high level, method 400 includes first financial institution 104 generating an electronic image 114 and capturing the original MICR code 115, archiving at least the original MICR code 115, and communicating both electronic data items to a second financial institution 104b, thereby allowing first financial institution 104a and the recipient to generate an image replacement document with the MICR code 115 in the original format. The following description focuses on the operation of a particular check processing engine 130 in performing this method. But system 100 contemplates using any appropriate combination and arrangement of logical elements implementing some or all of the described functionality.

Method 400 begins at step 402, where first financial institution 104a receives a physical check 112 from receiving entity 102. Of course, first financial institution 104a may also receive physical check 112 from any other appropriate component or institution. Next, first financial institution 104 generates an electronic image 114 based on received check 112 such as, for example, using scanner 128 at step 404. This electronic image 114 may comprise four images including a front image in black/white, a front image in grayscale, a back image in black/white, and a back image in grayscale. At step 406, first financial institution 104a captures or otherwise identifies MICR data 115 for received check 112. For example, first financial institution 104a may include scanner 128 with a digital camera operable to capture MICR data 115 from physical check 112. Next, check processing engine 130a embeds the identified MICR data 115 in electronic check image 114 using the original format at step 408. As described above, this format typically includes any dashes, spaces, or other spatial or character formatting that are physically printed or located on check 112. The original MICR data 115 may be embedded in the image header, in a constituent field of one of the constituent images, or in any other appropriate logical location. At step 410, check processing engine 130a truncates the identified MICR data 115 using any suitable technique. For example, check processing engine 130a may remove any dashes or spaces, may hash the MICR code 115 to conserve space or for security, or may generate some other representation of the MICR data 115. In certain embodiments, check processing engine 130a then embeds the truncated version of MICR data 115 in electronic check image 114, as shown step 412. Next, at step 414, check processing engine 130a archives the electronic check image 114, which now includes MICR data 115. According to certain embodiments, check processing engine 130a may generate or store a local copy of electronic check image 114 in memory 120. For example, check processing engine 130a may store the local copy in an audit record or log in memory 120a. In another example, check processing engine 130a may communicate a copy of electronic check image 114 to a data storage repository or archive 220. At step 416, check processing engine 130a communicates electronic check image 114 and the associated MICR data 115 to a recipient financial institution 104b, illustrated in FIG. 1, also termed second financial institution 104b.

Figure 5:
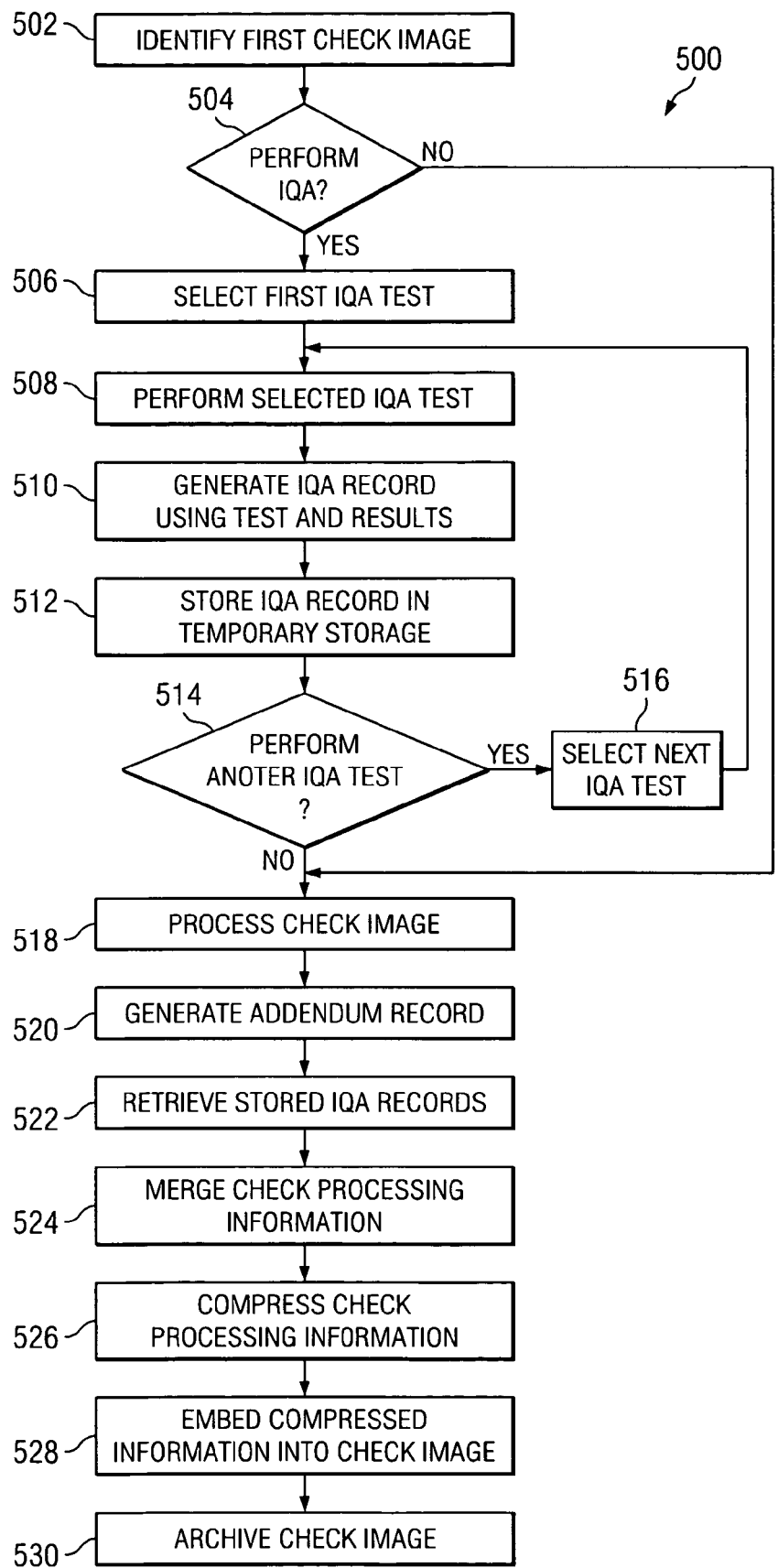
FIG. 5 is a flowchart illustrating an example method for embedding processing data in a check image in accordance with certain embodiments of the present disclosure.

FIG. 5 is a flowchart illustrating an example method 500 for embedding processing data in a check image 114 in accordance with certain embodiments of the present disclosure. Method 500 begins at step 502, where check processing engine 130 identifies a first check image 114. This check image may be stored in memory 120, received individually or as a batch from another financial institution 104, or identified using any other technique. Check processing engine 130 then determines if it should perform IQA on the particular image 114 at decisional step 504. For example, check processing engine 130 may instead review IQA tests and results that are already embedded in the check image 114 and verify that the results meet certain standards. If IQA is to be performed, then check processing engine 130 selects a first IQA test at step 506 and performs the selected tests at step 508. Next, check processing engine 130 generates an IQA record using the particular test and the associated results at step 510. For example, the IQA record may be one of the following records:

| Offset | Size | Description |
| --- | --- | --- |
| 0 | 1 Byte | Suspect status |
| 1 | 1 Byte | Version |
| 2 | 1 Byte | Records |
| 3 | 1 Byte | Threshold Image Below Minimum Size |
| 4 | 1 Byte | Threshold Image Above Maximum Size |
| 5 | 1 Byte | Threshold Folded or torn corners |
| 6 | 1 Byte | *Threshold Folded or torn edges |
| 7 | 1 Byte | *Threshold Document framing error |
| 8 | 1 Byte | Threshold Excessive skew |
| 9 | 1 Byte | Threshold Piggyback |
| 10 | 1 Byte | Threshold Image too light |
| 11 | 1 Byte | Threshold Image too dark |
| 12 | 1 Byte | Threshold Detect streaks and bands |
| 13 | 1 Byte | *Threshold Below minimum compressed image size |
| 14 | 1 Byte | *Threshold Above maximum compressed image size |
| 15 | 1 Byte | *Threshold Excessive spot noise |
| 16 | 1 Byte | *Threshold Front/Rear image dimension mismatch |
| 17 | 1 Byte | *Threshold Carbon strip detected |
| 18 | 1 Byte | *Threshold Image out of focus |
| 19 | 1 Byte | Threshold of Amount field |
| 20 | 1 Byte | Threshold of MICR field |
| 21 | 1 Byte | Threshold of Payee field |
| 22 | 1 Byte | Threshold of Payer field |
| 23 | 1 Byte | Threshold of Signature field |
| 24 | 1 Byte | Threshold of Document |
| 25 | 1 Byte | *Threshold of Date |
| 26 | 1 Byte | Threshold of CAR (Courtesy Amount Recognition) |
| 27 | 1 Byte | Threshold of LAR (Legal Amount Recognition) |
| 28 | 1 Byte | *Threshold Payee Endorsements |
| 29 | 1 Byte | Threshold for MICR comparison |
| 30 | 4 Bytes | Entry Number |
| 34 | 1 Byte | Reserved |
| 35 | 1 Byte | Min Size Score |
| 36 | 1 Byte | Max Size Score |
| 37 | 1 Byte | Corners Score |
| 38 | 1 Byte | Edges Score |
| 39 | 1 Byte | Framing Score |
| 40 | 1 Byte | Skew Score |
| 41 | 1 Byte | Piggyback Score |
| 42 | 1 Byte | Too Light Score |
| 43 | 1 Byte | Too Dark Score |
| 44 | 1 Byte | Streak Score |
| 45 | 1 Byte | Min Compression Size Score |
| 46 | 1 Byte | Max Compression Size Score |
| 47 | 1 Byte | Spots Score |
| 48 | 1 Byte | Dimension Mismatch Score |
| 49 | 1 Byte | Carbon Strip Score |
| 50 | 1 Byte | Focus Score |
| 51 | 1 Byte | Amount Score |
| 52 | 1 Byte | MICR Score |
| 53 | 1 Byte | Payee Score |
| 54 | 1 Byte | Payor Score |
| 55 | 1 Byte | Signature Score |
| 56 | 1 Byte | Document Score |
| 57 | 1 Byte | Date Score |
| 58 | 1 Byte | CAR Score |
| 59 | 1 Byte | LAR Score |
| 60 | 1 Byte | Payee Endorsement Score |
| 61 | 1 Byte | MICR Match Score |

In certain embodiments, the plurality of IQA tests and results may be collected into one record or data structure. The generated IQA record may then be stored in temporary storage, such as memory 120 or a data structure. Check processing engine 130 then determines if it should perform another IQA test at decisional step 514. If so, then check processing engine 130 selects the next IQA test at step 516 and processing returns to step 508.

Once IQA has been sufficiently performed (if appropriate), then financial institution 104 processes the check image 114 using any suitable technique at step 518. For example, financial institution 104 may verify the validity of the received files. Upon successful completion of the validation process, the cash letter data may be loaded into a database to preserve its original content. Then, based on the type of cash letter, the file or record is often routed to an existing ECP data system or processed through a "virtual capture" process, simulating a reader/sorter capture. Suspect images may be displayed to operators and bad/missing images are flagged as reversals and, if appropriate, are returned to the prior financial institution 104 based on the addendum records. When the IQA process is complete, the valid images 114 are typically loaded into the institution's archive (such as archive 220) using, for example, the institution's capture sequence numbers. Once the check image 114 has been suitably processed, then check processing engine 130 generates an addendum record at step 520. At step 522, check processing engine 130 retrieves the stored IQA records (if any) and merges the gathered check processing information at step 524. In certain embodiments, this check processing information may be compressed or otherwise encoded as indicated at step 526. This information is then stored, referenced, or otherwise embedded in any appropriate check image 114 at step 528. At step 530, check processing engine 130a may communicate a copy of electronic check image 114 to a data storage repository or archive 220. According to certain embodiments, check processing engine 130a may generate or store a local copy of electronic check image 114 in memory 120. For example, check processing engine 130 may store the local copy in an audit record or log in memory 120. In other embodiments, check processing engine 130 may (alternatively or in combination) communicate check image 114, with the embedded check processing information, to the next (recipient) financial institution 104.

The preceding flowcharts and accompanying descriptions illustrate exemplary methods 400 and 500. But system 100 contemplates using any suitable technique for performing these and other tasks. Accordingly, many of the steps in these flowcharts may take place simultaneously and/or in different orders than as shown. Moreover, system 100 may use methods with additional steps, fewer steps, and/or different steps, so long as the methods remain appropriate. For example, it will be understood that the truncation and the embedding of the truncated MICR data may not be performed in certain embodiments. In another example, check processing engine 130 may not merge or compress the check processing data, but may instead embed each data item in a different tag or storage location in image 114.

Indeed, although this disclosure has been described in terms of certain embodiments and generally associated techniques, alterations and permutations of these embodiments and techniques will be apparent to those skilled in the art. For example, the electronic check image may include both the MICR data in its original format, as well as some or al of the disclosed check processing data. In another example, the check processing engine may automatically present the check processing data to the user reviewing the particular check image through the GUI. In a further example, the check processing engine may allow an administrator to develop a profile for recipients of the image file that dynamically determines the appropriate data to embed in the particular image. Accordingly, the above description of example embodiments does not define or constrain this disclosure. Other changes, substitutions, and alterations are also possible without departing from the scope of this disclosure.

What is claimed is:

1. A computer implemented method for retaining check processing data comprising:
   identifying an electronic check image of a physical check from an electronic check image data structure, the electronic check image operable to generate an image replacement document;
   processing the check image to generate associated check processing data; and
   embedding at least a portion of the check processing data in the electronic check image data structure such that the electronic check image is operable to generate the same image replacement document, the embedded check processing data operable to be subsequently identified.

2. The method of claim 1, further comprising archiving the electronic check image into an archive file, the archive file comprising a header, a front image in black/white, a front image in grayscale, a back image in black/white, and a back image in grayscale.

3. The method of claim 2, wherein archiving the electronic check image into an archive file comprises adding the electronic check image with the embedded data to a standard archive without reconfiguring the archive.

4. The method of claim 1, wherein processing the check image comprises performing Image Quality Analysis (IQA) on the check image and the processing data comprising at least one IQA test and an associated result.

5. The method of claim 4, each IQA result selected from the group comprising:
   threshold image below minimum size;
   threshold image above maximum size;
   threshold folded or torn corners;
   threshold folded or torn edges;
   threshold document framing error;
   threshold excessive skew;
   threshold piggyback;
   threshold image too light;
   threshold image too dark;
   threshold detect streaks and bands;
   threshold below minimum compressed image size;
   threshold above maximum compressed image size; and
   threshold excessive spot noise.

6. The method of claim 1, the electronic check image comprising a Tag Image File Format (TIFF).

7. The method of claim 1, wherein processing the check image comprises:
   identifying a first financial institution at a second financial institution based on a first addendum record embedded in the electronic check image; and
   generating a second addendum record associated with the second financial institution.

8. The method of claim 7, wherein processing the check image further comprises identifying a plurality of debits associated with a particular credit and the processing data comprises an identifier of each debit and the particular credit.

9. The method of claim 1, further comprising compressing the check processing data prior to embedding in the electronic check image.

10. The method of claim 1, wherein the embedded check processing data is located separate from the electronic check image in the data structure.

11. A computer program product for retaining check processing data, the computer program product tangibly embodied on a machine-readable storage medium and comprising instructions operable to:
identify an electronic check image of a physical check from an electronic check image data structure, the electronic check image operable to generate an image replacement document;
process the check image to generate associated check processing data; and
embed at least a portion of the check processing data in the electronic check image data structure such that the electronic check image is operable to generate the same image replacement document, the embedded check processing data operable to be subsequently identified.

12. The computer program product of claim 11, further operable to archive the electronic check image into an archive file, the archive file comprising a header, a front image in black/white, a front image in grayscale, a back image in black/white, and a back image in grayscale.

13. The computer program product of claim 12, further operable to archive the electronic check image into an archive file comprises software operable to add the electronic check image with the embedded data to a standard archive without reconfiguring the archive.

14. The computer program product of claim 11, wherein the instructions operable to process the check image comprises instructions operable to perform Image Quality Analysis (IQA) on the check image and the processing data comprising at least one IQA test and an associated result.

15. The computer program product of claim 14, each IQA result selected from the group comprising:
threshold front/rear image dimension mismatch;
threshold carbon strip detected;
threshold image out of focus;
threshold of amount field;
threshold of MICR field;
threshold of payee field;
threshold of payer field;
threshold of signature field;
threshold of document;
threshold of date;
threshold of CAR (courtesy amount recognition);
threshold of LAR (legal amount recognition);
threshold payee endorsements;
threshold for MICR comparison;
entry number; and
reserved.

16. The computer program product of claim 11, the electronic check image comprising a Tag Image File Format (TIFF) file.

17. The computer program product of claim 11, wherein the instructions operable to process the check image comprises instructions operable to:
identify a first financial institution at a second financial institution based on a first addendum record embedded in the electronic check image; and
generate a second addendum record associated with the second financial institution.

18. The computer program product of claim 17, the electronic check image compliant with the X9.37 standard and the second addendum record comprising one of ninety-nine addendum records.

19. The computer program product of claim 11, wherein the software operable to process the check image comprises software operable to identify a plurality of debits associated with a particular credit and the processing data comprises an identifier of each debit and the particular credit.

20. The computer program product of claim 11, further operable to compress the check processing data prior to embedding in the electronic check image.

21. The computer program product of claim 11, the computer program product communicably coupled with a sorter control application.

22. The computer program product of claim 11, wherein the instructions operable to identify the electronic check image of the physical check comprises instructions operable to:
identify the physical check; and
generate the electronic check image based on the identified physical check.

23. The computer program product of claim 11, wherein the embedded check processing data is located separate from the electronic check image in the data structure.

24. An image capture system for retaining check processing data comprising:
a camera operable to generate an electronic check image data structure storing an electronic check image of a physical check, the electronic check image operable to generate an image replacement document;
a scanner operable to process the check image to generate associated check processing data; and
one or more processors operable to embed at least a portion of the check processing data in the electronic check image data structure such that the electronic check image is operable to generate the same image replacement document, the embedded check processing data located separate from the electronic check image in the data structure and operable to be subsequently identified.

25. The system of claim 24, the one or more processors further operable to archive the electronic check image into an archive file, the archive file comprising a header, a front image in black/white, a front image in grayscale, a back image in black/white, and a back image in grayscale.

26. The system of claim 25, wherein the one or more processors operable to archive the electronic check image into an archive file comprises the one or more processors operable to add the electronic check image with the embedded data to a standard archive without reconfiguring the archive.

27. The system of claim 24, the one or more processors further operable to compress the check processing data prior to embedding in the electronic check image.

28. The system of claim 24, the one or more processors further operable to perform Image Quality Analysis (IQA) on the check image based on the check processing data resulting in a one IQA result; and
add the IQA result and an identifier of the associated IQA test to the check processing data prior to embedding in the image.

29. The system of claim 28, each IQA result selected from the group comprising:
min size score;
max size score;
corners score;
edges score;
framing score;
skew score;
piggyback score;
too light score;
too dark score;
streak score;

min compression size score;
max compression size score;
spots score;
dimension mismatch score;
carbon strip score;
focus score;
amount score;
MICR score;
payee score;
payor score;
signature score;
document score;
date score;
payee endorsement score; and
MICR match score.

30. The system of claim 24, the one or more processors further operable to:
  identify a first financial institution at a second financial institution based on a first addendum record embedded in a received second electronic check image;
  generate a second addendum record associated with the second financial institution; and
  embed the second addendum record in the electronic check image.

31. The system of claim 24, the one or more processors further operable to identify a plurality of debits associated with a particular credit; and
  add an identifier of each debit and the particular credit to the processing data prior to embedding in the image.

* * * * *